(12) United States Patent
Mongillo, III et al.

(10) Patent No.: US 9,836,742 B2
(45) Date of Patent: Dec. 5, 2017

(54) OFFLINE ACCESS OF A NETWORK BASED APPLICATION

(71) Applicant: Starbucks Corporation, Seattle, WA (US)

(72) Inventors: Lincoln C. Mongillo, III, Seattle, WA (US); Christopher J. Barrows, Kirkland, WA (US); Todd M. Parker, Somerville, MA (US); Patricia A. Toland, Quincy, MA (US)

(73) Assignee: STARBUCKS CORPORATION, Seattle, WA (US)

( * ) Notice: Subject to any disclaimer, the term of this patent is extended or adjusted under 35 U.S.C. 154(b) by 0 days.

(21) Appl. No.: 14/477,681

(22) Filed: Sep. 4, 2014

(65) Prior Publication Data
US 2015/0262174 A1 Sep. 17, 2015

Related U.S. Application Data

(60) Provisional application No. 61/954,462, filed on Mar. 17, 2014.

(51) Int. Cl.
| | |
|---|---|
| *G06Q 20/40* | (2012.01) |
| *G06Q 20/20* | (2012.01) |
| *G06Q 20/10* | (2012.01) |
| *G06Q 50/12* | (2012.01) |
| *G06Q 20/34* | (2012.01) |
| *G06Q 20/32* | (2012.01) |
| *G06K 15/00* | (2006.01) |

(52) U.S. Cl.
CPC ............. *G06Q 20/40* (2013.01); *G06Q 20/10* (2013.01); *G06Q 20/20* (2013.01); *G06Q 20/32* (2013.01); *G06Q 20/327* (2013.01); *G06Q 20/351* (2013.01); *G06Q 50/12* (2013.01)

(58) Field of Classification Search
USPC .......................................... 705/15
See application file for complete search history.

(56) References Cited

U.S. PATENT DOCUMENTS

| | | |
|---|---|---|
| 6,473,739 B1 | 10/2002 | Showghi et al. |
| 6,584,309 B1 | 6/2003 | Whigham |
| 7,552,094 B2 | 6/2009 | Park et al. |
| 7,963,441 B2 | 6/2011 | Emmons et al. |
| 8,038,054 B2 | 10/2011 | Douma |
| 8,091,781 B2 | 1/2012 | Albrecht et al. |

(Continued)

FOREIGN PATENT DOCUMENTS

| | | |
|---|---|---|
| AU | 2007203063 | 7/2007 |
| AU | 2012100127 | 3/2012 |

(Continued)

*Primary Examiner* — Garcia Ade
(74) *Attorney, Agent, or Firm* — Knobbe, Martens, Olson & Bear LLP (57) ABSTRACT

The present disclosure relates to an interactive computing system configured to provide a network-based application that can provide offline functionality. A user computing device, such as a mobile device, access a network-based application through an interactive computing system. The network-based application can be configured to provide transaction information sufficient to conduct a transaction with a point-of-sale terminal when the network application is not in communication with the interactive computing system.

23 Claims, 8 Drawing Sheets

(56) References Cited

U.S. PATENT DOCUMENTS

| | | |
|---|---|---|
| 8,317,086 B2 | 11/2012 | Dudek et al. |
| 8,418,919 B1 | 4/2013 | Beyda |
| 8,467,602 B2 | 6/2013 | Boncyk et al. |
| 2003/0110136 A1 | 6/2003 | Wells et al. |
| 2005/0187864 A1 | 8/2005 | Grear et al. |
| 2011/0258058 A1 | 10/2011 | Carroll et al. |
| 2012/0029994 A1 | 2/2012 | Barkan et al. |
| 2012/0191551 A1 | 7/2012 | Lutnick et al. |
| 2012/0296679 A1* | 11/2012 | Im .................. G06Q 10/02 705/5 |
| 2013/0024299 A1 | 1/2013 | Wong et al. |
| 2013/0090959 A1 | 4/2013 | Kvamme et al. |
| 2013/0153655 A1* | 6/2013 | Dawkins ............ G07G 1/0045 235/383 |

FOREIGN PATENT DOCUMENTS

| | | |
|---|---|---|
| AU | 2012101126 | 8/2012 |
| CN | 101900093 | 12/2010 |
| GB | 2 370 378 B | 3/2005 |
| GB | 2472067 A | 1/2011 |
| GB | 2485575 A | 5/2013 |

* cited by examiner

OFFLINE ACCESS OF A NETWORK BASED APPLICATION

INCORPORATION BY REFERENCE TO ANY PRIORITY APPLICATIONS

Any and all applications for which a foreign or domestic priority claim is made are identified in the Application Data Sheet as filed with the present application and are incorporated by reference under 37 CFR 1.57 and made a part of this specification.

BACKGROUND

Generally described, computing devices, such as mobile devices, can provide users with various functionality or functions through the execution of applications. In one aspect, a computing device, often referred to as a client computing device, can execute software code, referred to as a software application, that has been configured specifically for the operating system or operating environment associated with the client device. Based on their dependence to the operating system, such custom applications can be referred to as native application. In another aspect, network-based applications, also referred to as web apps or web applications, are hosted by browser software applications are used ubiquitously by users on communication networks, such as the Internet. Common web applications include electronic mail, online retail sales, online auctions, wikis and many other functions that are available for use over a network.

Unlike native applications, web applications allows for the development of an application that can be independent of a type of computer or operating system that is hosting the browser software application. Web applications commonly use a combination of server-side script (such as active server pages (ASP), PHP, etc.) and client-side script (such as hypertext markup language (HTML), JavaScript, etc.) to implement the web application. The client-side script can determine the presentation of information on the browser while the server-side script can be configured to store and retrieve information from a server.

Because web applications are hosted by a browser on a client computing device independent of operating environment, a user can use any computing device and or operating system that has a browser capable of executing on the client device. Web applications are popular due to the ubiquity of browsers, and the convenience of using a browser as a client. The ability to update and maintain web application without distributing and installing software on potentially thousands of client computers is an important reason for their popularity, as is the inherent support for cross-platform compatibility.

In a typical web application, a user is required to be in active communication with a network in order to access the content and functionality associated with the web application. This can lead to difficulties if a user needs to use the web application in an area has little or no network connectivity.

BRIEF DESCRIPTION OF THE DRAWINGS

Throughout the drawings, reference numbers are re-used to indicate correspondence between referenced elements. The drawings are provided to illustrate embodiments described herein and not to limit the scope thereof.

DETAILED DESCRIPTION

Generally described, the present disclosure relates to an interactive computing system configured to provide a network-based application that can provide offline functionality. A user computing device can access the network-based application through the interactive computing system. The network-based application can be used by the user device to provide transaction information to a point-of-sale terminal in order to conduct a transaction when the network-based application is not in communication with the interactive computing system. For example, the network-based application can facilitate point-of-sale transactions even in scenarios when the user computing device does not have network connectivity or limited connectivity.

Illustratively, the network-based application can use an account-based system for accessing the content and functionality associated with the network-based application. The network-based application can define an online feature set and an offline feature set. The online feature set includes features available to a user when the user device is in communication with the interactive computing system and the offline feature set includes features available to the user when the user device is not in communication with the interactive computing system. The offline feature set can be accessed and utilized by the network-based application based on user account information, also referred to as user information, and application information stored in an application cache without requiring communication with the interactive computing system.

When in an offline mode, the network-based application can be configured to perform functions based on user account information. For example, the network-based application can provide a point-of-sale terminal with information sufficient to authorize a transaction. The information can include a computer readable code that is provided to the point-of-sale terminal. The computer readable code can include the user information embedded within the code. The point-of-sale terminal can communicate with the interactive computing system to authorize the transaction. Even though the network-based application is not in communication with interactive computing system, the network-based application can provide a user with the ability to provide sufficient information at the point-of-sale terminal to execute the transaction.

Illustratively, in some embodiment, the network-based application can be associated with a retail establishment, such as a food services provider. The network-based application can provide a user with functionality for managing one or more user accounts associated with the food service establishment, often provided as an account card having a bar code that can be read by a point-of-sale terminal. The user account cards can be associated with a specific user account. The cards can be loyalty cards, such as cards that accumulate points based on purchases made by the user, account cards, such as gift cards or charge cards that have a monetary account value for purchasing goods or services from the food service establishment, or other types of cards associated with the user account. In accordance with some embodiments, the network-based application can manage information associated with each card, such as updating card information, determining account balances, increasing account balances, associating additional cards with the user account, and providing other functionality for managing cards associated with the user account. The network-based application can be configured to provide a computer readable code embedded with user account information of an account card, such as a card identifier, an account identifier, an account balance, a non-monetary balance, and/or other user account information. Each account card can be associated with a different computer readable code. The computer readable code can be used to authorize payment of a transaction at the food service establishment.

In some embodiments, the network-based application can be configured to perform other functions associated with a food service establishment, such as viewing a menu or identifying a food service establishment closest to the user, generating orders that can be provided to the establishment. In some embodiments, the network-based application can be configured create a custom order that can be used to generate computer readable code associated with that order. A user can then provide the order to the food service establishment by presenting the machine readable code to a point-of-sale terminal. In some embodiments, the machine readable code for the order can be combined with the machine readable code for the payment information.

Although aspects of the present disclosure will be described with regard to an illustrative network-based application with offline functionality, one skilled in the relevant art will appreciate that the disclosed embodiments are illustrative in nature and should not be construed as limiting. Still further, although a number of illustrative examples will be discussed with regard to the present disclosure, such examples should not necessarily be construed as limiting.

Figure 1:
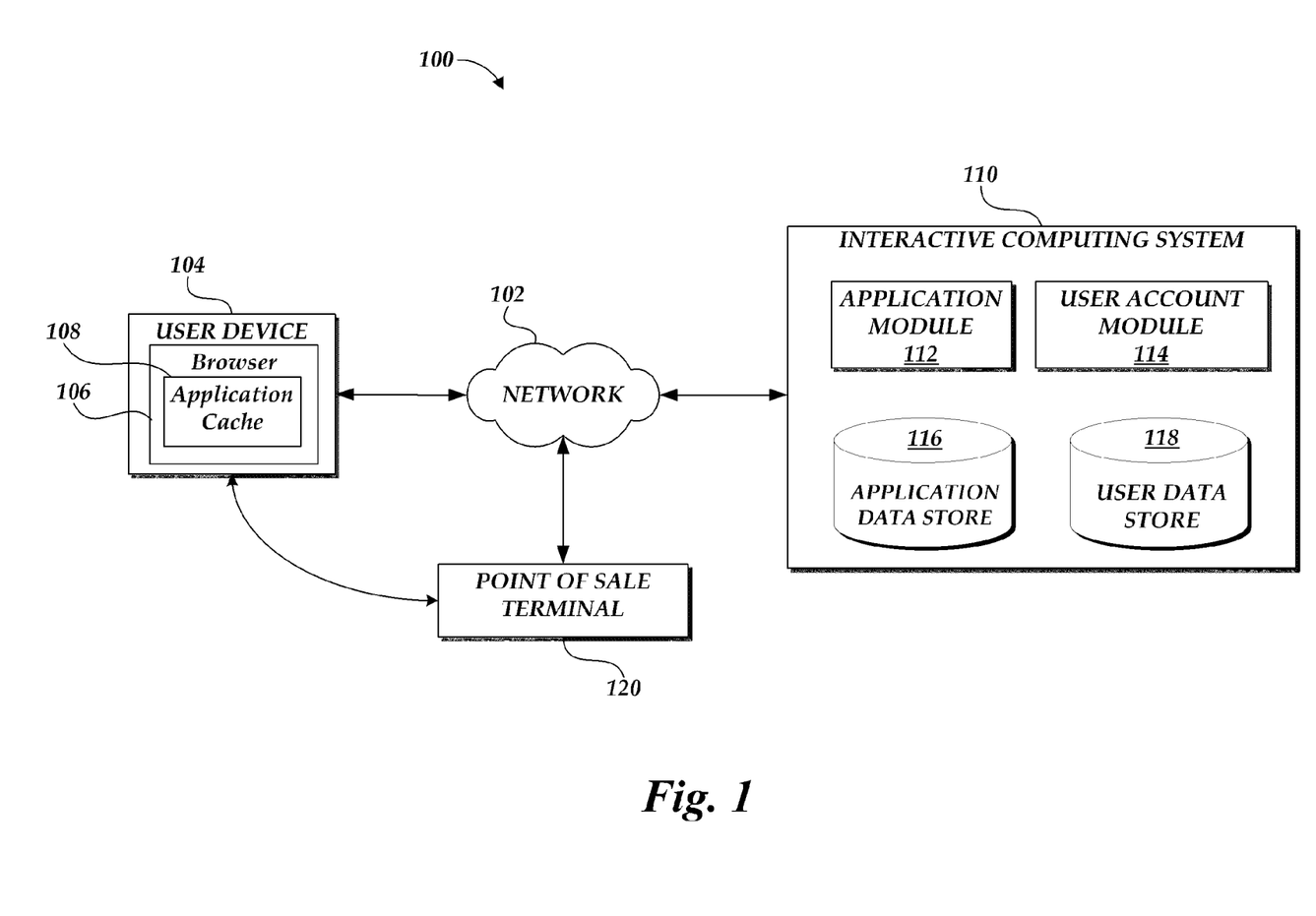
FIG. 1 illustrates a block diagram depicting an illustrative embodiment of a computing environment for an interactive computing system.

FIG. 1 illustrates a network environment 100 for an interactive computing system that is configured to provide a network-based application with offline functionality. The networking environment 100 includes one or more user devices 104, an interactive computing system 110 and one or more point-of-sale terminals 120 in communication with a network 102. The user device 104 includes a browser 106 with an application cache 108. The interactive computing system 110 includes an application module 112, a user account module 114, an application data store 116 and a user data store 118.

The user device 104 can be representative of a plurality of user devices 104 that can communicate with an interactive computing system 110 through a network 102. The user computing devices 104 can correspond to a wide variety of devices or components that are capable of initiating, receiving or facilitating communications over the communication network 102 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the user computing devices 104 include a wide variety of software and hardware components for establishing communications over one or more communication networks, including wireless communication network, a wired communication network, or an IP-based telecommunication network. Illustrative components of a user computing device 104 will be described in greater detail with regard to FIG. 2.

The communication network 102 may be any wired network, wireless network or combination thereof. In addition, the communication network 102 may be a personal area network, local area network, wide area network, cable network, satellite network, cellular telephone network or combination thereof. Protocols and components for communicating via the Internet or any of the other aforementioned types of communication networks are well known to those skilled in the art of computer communications and thus, need not be described in more detail herein.

The point of sale terminal 120 can be in communication with the interactive computing system 110 over the network 102. Additionally, the point of sale terminal 120 can communicate directly with the user devices 104, such as via short range radio, direct wired connection, optical connections, and the like. The point-of-sale terminal 120 can be a terminal at a retail establishment, food service establishment, stand-alone kiosk, mobile device or other type of point-of-sale terminal. The point-of-sale terminal 120 can configured to have a scanning device or other mechanism capable of reading computer readable codes, such as bar codes, QR codes, or other visible computer readable codes.

Illustratively, the point-of-sale terminal 120 can have software and hardware configured to wirelessly communicate using radio frequency (RF), Bluetooth®, or other type of wireless communication protocol. The point-of-sale terminal 120 can be configured to receive a computer readable code from the user device 104 as part of a transaction and communicate information contained in the computer readable code to the interactive computing system 110 over the network. The interactive computing system 110 can authorize the information received from the point-of-sale terminal 120 in order to authorize the transaction. The point-of-sale terminal 120 can be configured to transmit information to the user device that can be used to update the network-based application based on the information received from the interactive computing system. In some embodiments, the point-of-sale terminal 120 can be associated with the same entity as the interactive computing system 110. For example, the interactive computing system 110 and point-of-sale terminal 120 can be associated with a specific food service establishment.

The interactive computing system 110 includes an application module 112, a user account module 114, an application data store 116 and a user data store 118. The interactive computing system 110 may be implemented in hardware and/or software and may, for instance, include one or more servers having physical computer hardware configured to implement computer executable instructions for performing various features that will be described herein. The one or more servers may be geographically disbursed or geographically co-located, for instance, in one or more data centers.

The interactive computing system 110 can include servers, which can communicate with the user devices 104 over the network 102 and which can provide access to various services of the interactive computing system 110. The services of the interactive computing system 110 can be implemented by the content module 112 in conjunction with the authentication module 114. These services can be implemented in physical computer hardware on the servers or in separate computing devices. Moreover, the processing of the various components or services of the interactive computing system 110 can be distributed across multiple machines, networks, or other computing resources. The various components or services of the interactive computing system 110 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. Executable code modules that implement various functionalities of the interactive computing system 110 can be stored in the content data store 116 and user data store 118 on memories of the servers and/or on other types of non-transitory computer-readable storage media. The interactive computing system 110 can be configured so that each of the components shown can communicate with any other components.

The application module 112 can be configured to implement a network-based application on the user device. The application module 112 defines the features, content and functionality of the network-based application. The application module 112 can include executable code modules, for implementing the various functionalities of the network-based application, including server-side code modules configured to be implemented by the interactive computing system 110 and client-side code modules configured to be implemented by the user device 104. The application module 112 can define the user interface and display parameters of the network-based application.

The network-based application can utilize an account-based system for controlling access to the features and functionality associated with the network-based application, such as an email account. The network-based application can store user information and general application information in an application cache on the user device. The application module 112 can be configured to define an online feature set and an offline feature set. The online feature set includes the content and functionality that are available to a user when the user device is in communication with the interactive computing system. The offline feature set includes the content and functionality of the network-based application that are available to the user when the user device is not in communication with the interactive computing system. The offline feature set can be a subset of the online feature set.

The offline feature set can be accessed and utilized by the network-based application based on the user information and application information stored in the application cache without requiring a connection to the interactive computing system. The application cache can be configured to store functionality and content associated with the network-based application. In addition to the functionality and content associated with the web application the application cache can also store user account information associated with the application. In some embodiments, the application cache can store user account information for a plurality of user accounts. The interactive computing system can flag information that requires an update. The updated information can be received by the user device and stored in the user device application cache.

In an illustrative example of offline functionality, a network-based application associated with a food service establishment can enable a user to prepare a custom order and provide payment to the food service establishment based on the user account information and application information stored in the application cache.

The application module 112 is in communication with the application data store 116. The application data store 116 can include any content or data associated with the operation and functionality of the network-based application. The application data store 116 can represent local and/or remote, physical and/or logical data storage, including, for example, storage area networks or other distributed storage systems.

The user account module 114 can be configured to perform actions associated with information contained within user accounts. For example the user account module can be configured to authenticate authentication credentials provided by the application and interact with the point-of-sale terminal 120 in order to authorize transactions associated with information stored within a user account. The user account module can also be configured to update the user account when information is received that modifies the information stored in the user data store 118.

The user data store 118 can store the user information associated with each user account of the interactive computing system. The user account information can include user preferences, personal information, financial information, and other account specific information. The financial information can include information such as credit card information, store card balances, or other financial information associated with the user account, such as recurring subscriptions.

Figure 2:
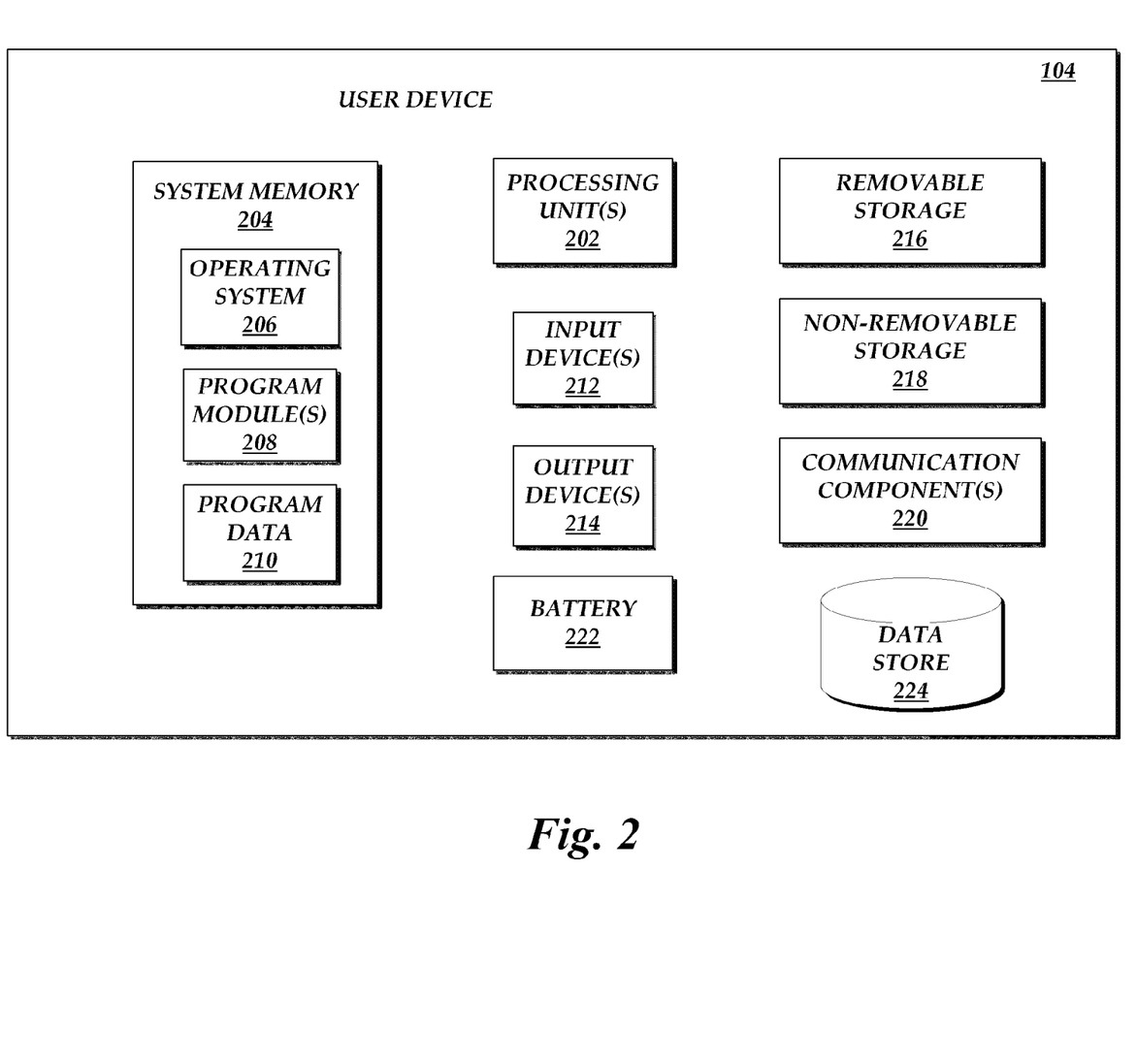
FIG. 2 illustrates components of an embodiment of a user computing device.

FIG. 2 illustrates components of an embodiment of a user computing device 104, such as a mobile telephone. The user computing device 104 may include one or more processing units 202, such as one or more CPUs. The user computing device 104 may also include system memory 204, which may correspond to any combination of volatile and/or non-volatile computer-readable storage media. The system memory 204 may store information which provides an operating system module 206, various program modules 208, program data 210, and other modules. The user device 104 can have browser software installed in system memory 204, program modules 208 and/or program data 210.

The browser software can be configured to have an application cache. The application cache can be configured to store the information received from the interactive computing system for the network-based application. When the browser interacts with the web application the browser can receive information associated with the application and store the information in the application cache. The information stored in the application cache can include application information and user account information.

In either an online mode or an offline mode, the network-based application can be retrieved from application cache before communicating with the interactive computing system. By loading the application from the application cache first, the network-based application can decrease load times, reduce bandwidth requirements usage of the application and increase performance.

The user computing device 104 performs functions by using the processing unit(s) 202 to execute modules stored in the system memory 204. The user computing device 104 may also include one or more input devices 212 (keyboard, mouse device, specialized selection keys, etc.) and one or more output devices 214 (displays, printers, audio output mechanisms, etc.). One skilled in the relevant art will appreciate that additional or alternative software modules and/or hardware components may also be included in the user computing device 104 to carry out other intended functions such as mobile telephone functions.

With continued reference to FIG. 2, the user computing device 104 may also include a battery 222, one or more types of removable storage 216 and one or more types of non-removable storage 218. In some embodiments the device can be connected to an external power source, such as an AC power outlet. Still further, the user computing device 104 can include communication components 220, such as a cellular transceiver and a wireless transceiver, for facilitating communication via wired and wireless communication networks. These transceivers facilitate such communication using various communication protocols including, but not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on code division multiplex access (CDMA), time division multiple access (TDMA), global system for mobile communications (GSM), wireband code division multiplex access (WCDMA), code division multiplex access $3^{rd}$ generation (CDMA1040), time division synchronous code division multiple access (TD-SCDMA), wavelength and time division multiple access (WTDMA), long term evolution (LTE), orthogonal frequency division multiple access (OFDMA), and similar technologies).

The above-enumerated list of components is representative and is not exhaustive of the types of functions performed, or components implemented, by the user computing device 104. One skilled in the relevant art will appreciate that additional or alternative components may also be included in the user computing device 104 to carry out other intended functions.

Figure 3A:
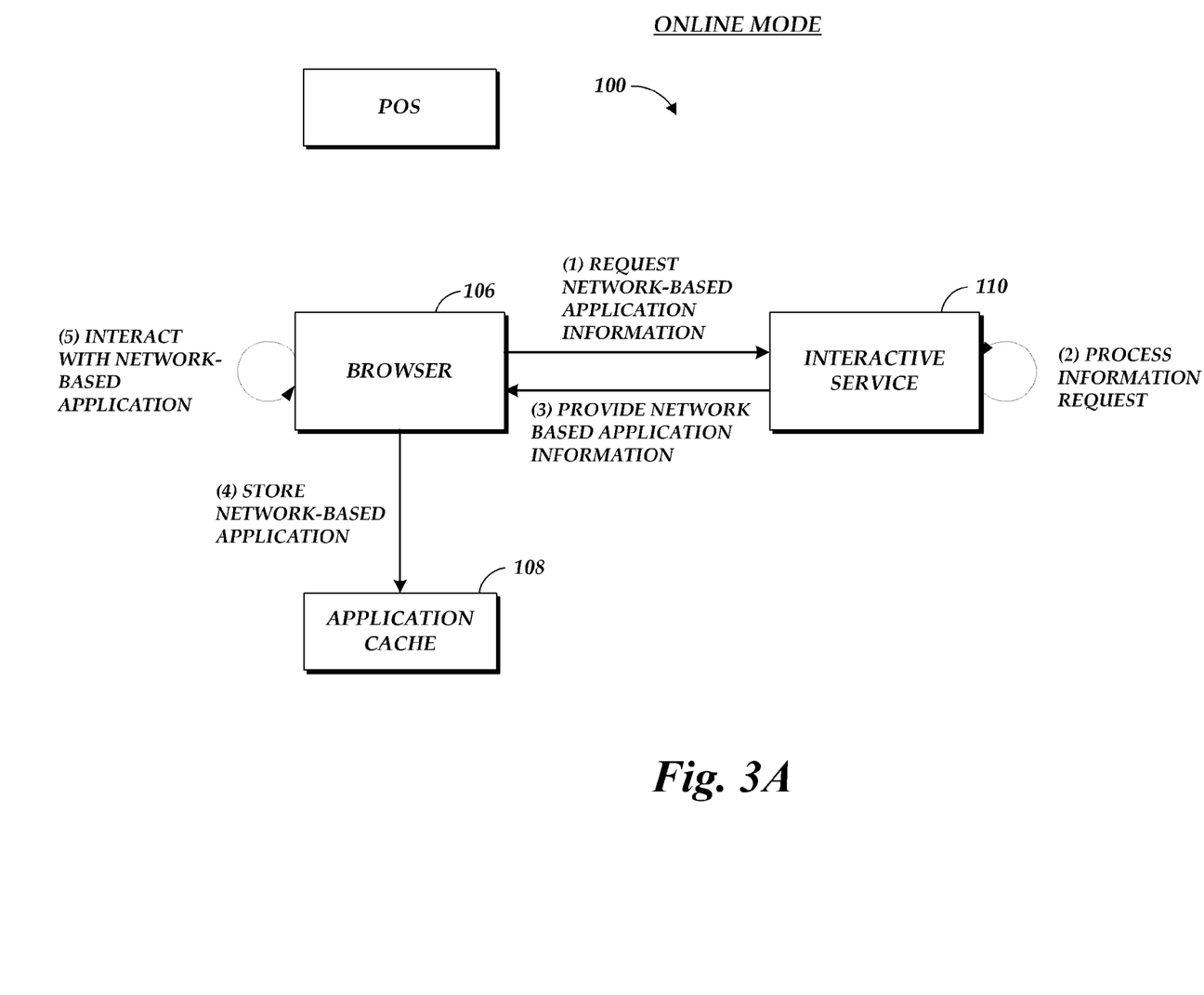
FIGS. 3A and 3B illustrate an embodiment of a state flow diagram in which a user computing device is configured to implement offline functionality in a network-based application.
Figure 3B:
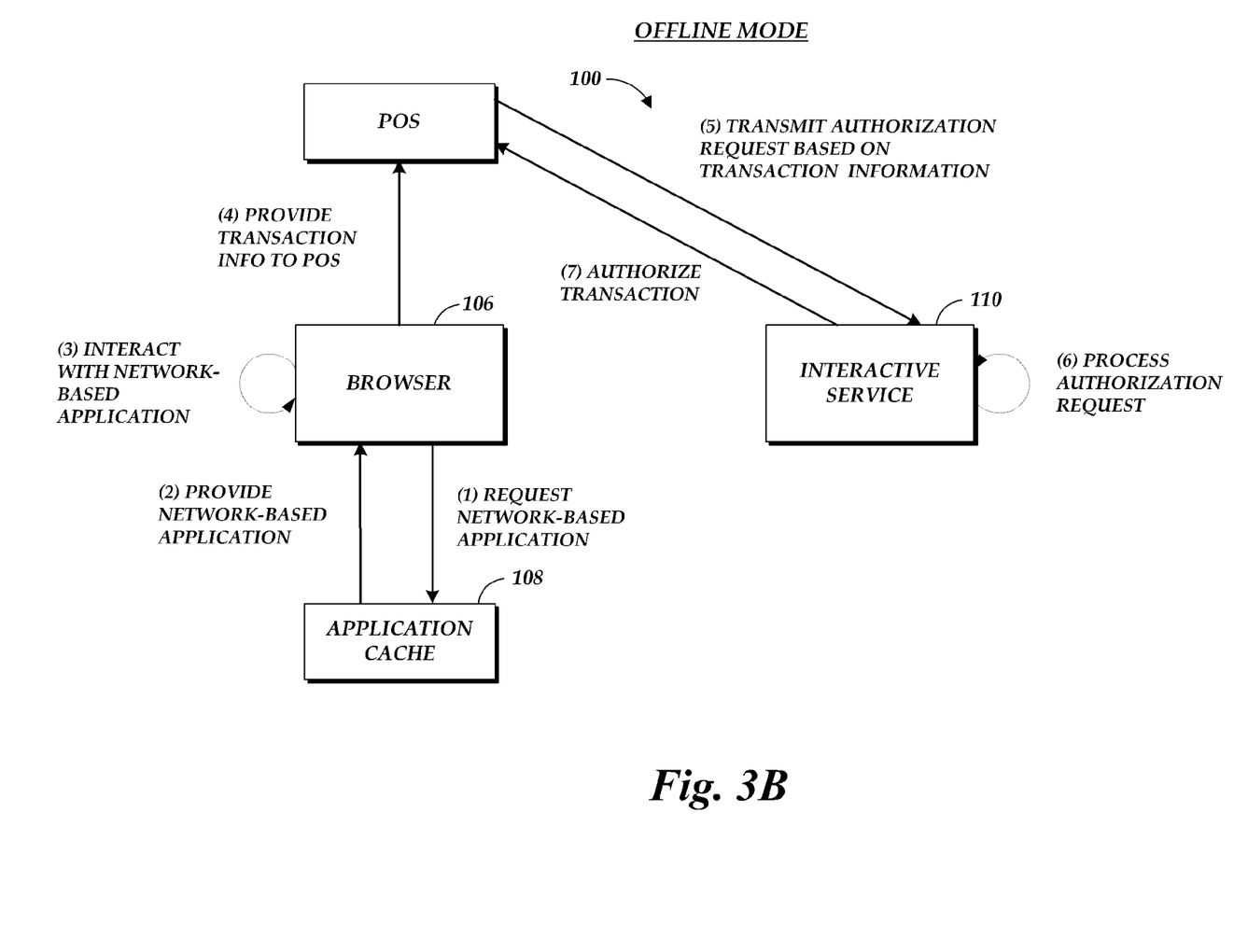

FIGS. 3A and 3B illustrate state diagrams showing interactions between a point of sale terminal 120, a browser 106, an application cache 108 and an interactive computing system 110. FIG. 3A illustrates when the network-based application is operating in an online mode and is in communication with the interactive computing system. FIG. 3B illustrates when the network-based application is operating in an offline mode and is not in communication with the interactive computing system 110.

At (1), the network-based application requests information from the interactive computing system. The request can be made when the user device accesses the network-based application through a browser. The request may include requests for all of the information associated with the network-based application, a portion of the information associated with the network-based application and/or updates to the information stored in the application cache. The network-based application can request information that is designated as not being stored in the application cache.

At (2), the interactive computing system processes the request from the network-based application. The request can identify application information and user account information. The request may be an authentication request. For an authentication request, the request may include authentication credentials for a user account that can be authenticated by the user account module. The authentication credentials can include an account identifier and password associated with a user account stored on the interactive computing system. If the authentication is successful, the interactive computing system can provide access to the application.

At (3), the interactive computing system provides application information and/or user account information to the device. At (4) the browser stores the application information and/or the user information in the application cache. The application information can include information that applies to all users that utilize the network-based application. For example, a network-based application has information that every user of application receives, such as user interface, formatting, and other application information. The user information can be information associated with a specific user account and can be stored in a user data store on the interactive computing system. The actions associated with (1) through (4) can be completed as necessary until the application can be implemented within the browser.

At (5), the user can interact with the network-based application and utilize the content and functionality provided in the network-based application in the online feature set. For example, the user can update user account information stored on the interactive computing system. Updates to the user account information on the network-based application can be communicated back to the interactive computing system. As the information is communicated between the interactive computing system and the browser, the information in the application cache can be continually updated so that the user device is up-to-date with the most recent information. The updated information can be used when the network-based application is operated in the offline mode.

FIG. 3B illustrates an offline mode of operation for the network-based application. At (1), the browser 106 requests and loads the network-based application from the application cache 108. In some embodiments, the user may need to provide authentication credentials to access the network-based application. At (2), the application cache 108 provides the network-based application to the browser 106. If authentication is needed, the network-based application can use the information in the application cache to authenticate the user and access the correct user account.

At (3), the user device can interact with the network-based application. The network-based application may have an offline feature set that provides at least a portion of the functionality of the online feature set. In the offline mode, the network-based application is not be able to update information in the application with information from the interactive computing system. In offline mode the network-based application can provide access to user account information. In some embodiments, the network-based application may default to the last user account accessed in online mode or it may provide an authentication interface that the user logs into in order to access the user account. Authentication of the user account may be implemented in accordance with information stored in the application cache. In some embodiments, the network-based application may use a web object, such as a cookie, for storing information that the network-based application can use to authenticate and connect the user to a user account. When the user is connected to the user account, the user can access functions and information that utilize user account information. The offline feature set can contain limited functionality for updating user account information such as financial information, adding funds to an account, or other functionality that requires a network connection.

The offline mode feature set can include functionality that allows a user to interact with user account information, such as financial information. For example, the network-based application can use the user account information stored in the application cached to authorize the payment of a transaction at a point-of-sale terminal. In some embodiments, the network-based application can generate a computer readable code that can communicate user information to the point-of-sale terminal, which can be used by the point-of-sale terminal to authorize a transaction.

In some embodiments, an account can have one or more virtual and/or physical cards associated with the user account. The cards can be loyalty cards, such as cards that accumulate points based on purchases made by the user, account cards, such as gift cards or charge cards that have a monetary account value for purchasing goods or services, or other types of cards associated with the user account. Each card can include a card identifier associated with the card, such as a card number or account number. In some embodiments, the card can include an account balance.

The user information can be used by the network-based application to provide the point-of-sale terminal with transaction information to authorize a transaction. The point-of-sale terminal can use the card identifier to authorize the transaction based on information stored in the user data store on the interactive computing system. The network-based application can provide transaction information to the point-of-sale terminal. In some embodiments, the transaction information includes computer readable code. The computer readable code can be generated by the network-based application. In some embodiments, the computer readable code can be generated by the interactive computing system and stored in application cache. The computer readable code can include the user information embedded within the code. The computer readable code can be a bar code, QR code, radio frequency (RF) identification code, or other type of computer generated code. The computer generated code can be a visible code or a code that is transmitted to the point-of-sale using near field communication technologies such as RF, Bluetooth® or other technologies for communicating wirelessly over a relatively short distance. In some embodiments, the computer readable code can include a card identifier and a custom order. For example, the network-based application could generate a custom order for the user and combine the custom order information with and the card information.

At (4), transaction information, such as a computer generated code, can be provided to the point-of-sale terminal for a transaction. The transaction information can include instructions, a computer readable code, or other type of information that the user can present to the point-of-sale terminal. The transaction information includes at least a portion of the user account information stored in the application cache. For example the network-based application can generate a computer generated code that has user account information embedded in the computer generated code. In some embodiments, the user account information includes a card identifier, an account balance associated with identified card, a user account identifier, a non-monetary account balance, and/or other information that can be used to by the point-of-sale terminal for processing the transaction. The transaction information can be provided in order to authorize payment of the transaction.

At (5), the point-of-sale terminal processes the transaction information provided by the network-based application and transmits an authorization request to the interactive computing system based, at least in part, on the transaction information. The point-of-sale terminal can transmit the transaction information to the interactive computing system for authentication. In some embodiments, the network-based application may provide sufficient information such that the point-of-sale terminal can authorize the transaction without requesting authorization from the interactive computing system. For example, the transaction information may include a card identifier and an account balance.

At (6), the interactive computing system processes the authorization request based on the transaction information provided by the point-of-sale terminal. In an exemplary embodiment, the user account module of the interactive computing system can determine whether to authorize or deny the transaction request. The transaction information is used to identify a user account stored in the user data store. The user account module can approve or deny the authorization request based on the user account information. For example, the user account module can determine whether there are sufficient or insufficient funds for the proposed transaction.

At (7), the interactive computing system sends the response back to the point-of-sale terminal, approving or denying the transaction. The interactive computing system can also update the user account information based on the result of the transaction. The next time the browser accesses the network-based application on the interactive computing system can provide updated user information to the browser for storage in the application cache.

Figure 4A:
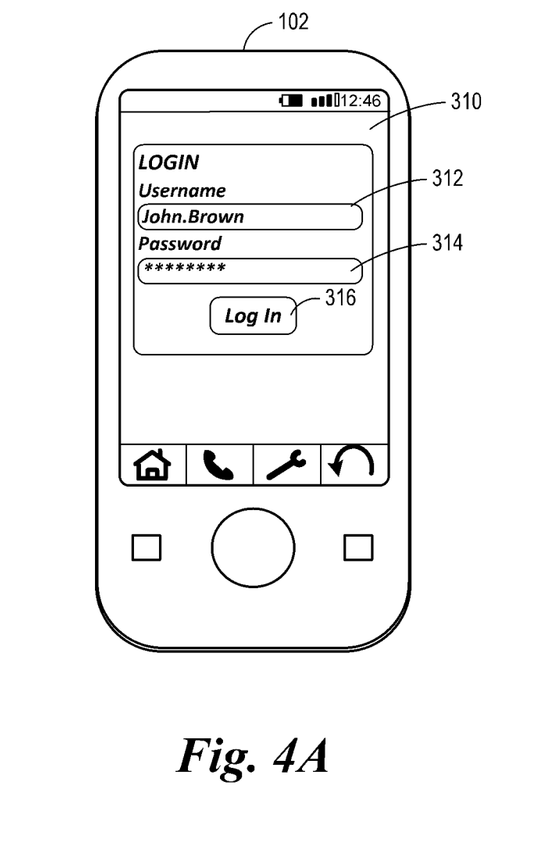
FIGS. 4A and 4B illustrate an embodiment of user interfaces of a network-based application implemented on a user computing device.

FIG. 4A illustrates a user interface 410 of a network-based application having a plurality of user inputs for a user to provide authentication credentials for accessing the network-based application. The login user interface 410 includes a plurality of authorization inputs, including a username input 412 and a password input 414. When the user selects the login user input 416, the authentication credentials provided by the user to inputs 412 and 414 can be provided to the interactive computing system 110 for authentication. After the user device completes the authentication, the user device can be logged into the network-based application under the user account associated with the authentication credentials. In some embodiments, the login user interface can be accessed in the offline mode and the online mode of the network-based application.

Figure 4B:
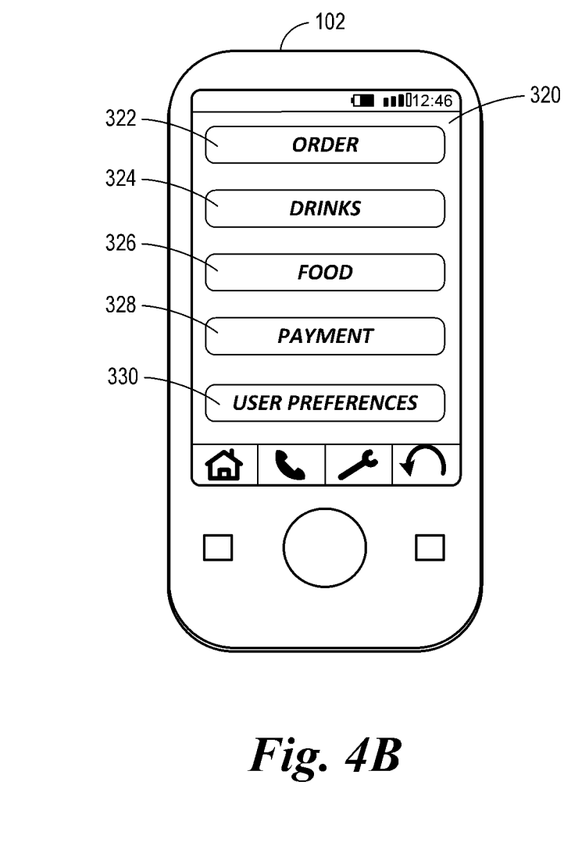

FIG. 4B illustrates a user interface 420 for displaying content provided by the network-based application. The user interface 420 displays content user controls, including an order control 422, a drinks control 424, a food control 426, a payment control 428, and a user preferences control 430. Each of these controls can be assigned specific functions in accordance with the functionality assigned by the application module 112. When in an online mode the user can have access to the features of the network-based application defined by the online feature set. When in the offline mode the user can access a subset of features provided by the network-based application as defined by the offline feature set. Only features associated with the offline feature set can accessed when the user is in the offline mode. In some embodiments, visual characteristics of controls that are not associated with the offline feature set can be modified, for example, a control can be dimmed or greyed out to illustrate that the control or object is not functioning. In some embodiments, objects that would require a network connection to function can fall back on the most recent information received from the interactive computing system. In such a case, the information may not be the most current information that would be available from the interactive computing system.

Figure 5A:
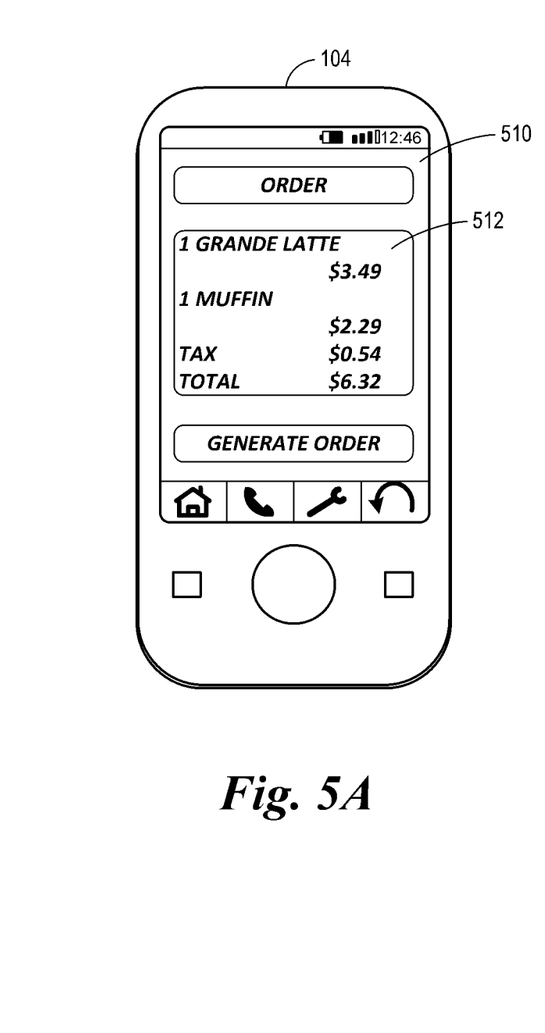
FIGS. 5A and 5B illustrate an embodiment of user interfaces of the network-based application implementing functionality of the network-based application.
Figure 5B:
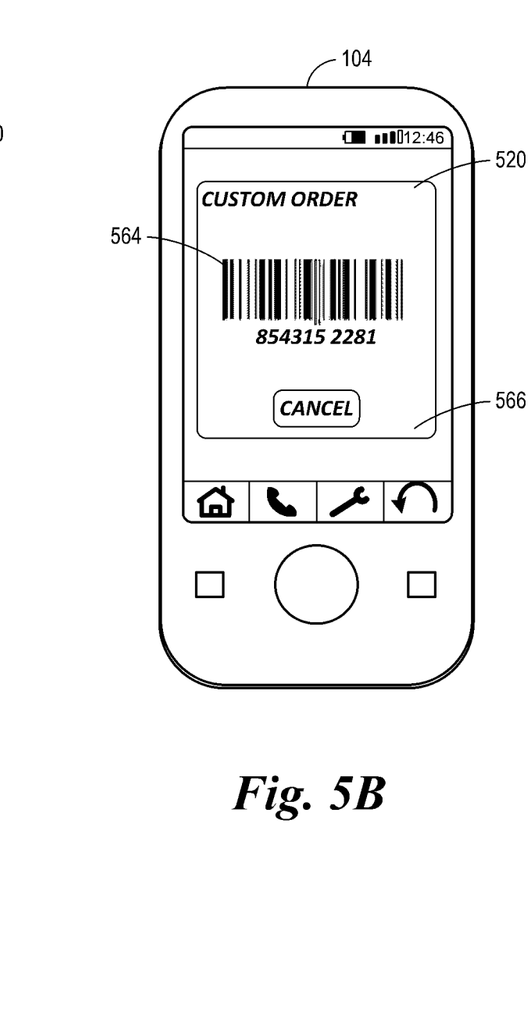

FIGS. 5A and 5B illustrate an embodiment of a network-based application that can implement general functions that use application information stored in the application cache. In this embodiment, the user can generate, reproduce or recall a computer readable code that represents a custom food order. FIG. 5A illustrates a user interface 340 showing an order 512 created by the user. The order interface 510 illustrates content that is available to user in the offline feature set. The order 512 includes a plurality of items selected by the user, a cost associated with the items and an order total. In this illustrative example, the user can access a menu, create one or more orders, add or remove items from the proposed order, and generate a custom order code. After the user creates the order, the user can generate the custom order by selecting the control 514.

FIG. 5B illustrates an interface 520 showing an embodiment of the generated custom order. The generated order can be represented by a machine readable code 522. The machine readable code containing the order items of the custom order could be presented at a point-of-sale terminal for transmission of the order to a food service establishment for preparation. In some embodiments the use can choose to save the order to their user account with the control 524. FIGS. 5A and 5B merely illustrate one exemplary embodiment of functionality that could be associated with a network-based application that could be performed while the network-based application is operating in an offline mode. The network-based application can have different permutations or functionality dependent upon the design of the web application. Additionally, in some embodiments, at least some portion of the machine readable codes may be pre-generated and stored by the user devices. In such embodiments, the user device may recall at least portions of the machine readable code in response to the generation of order.

Figure 6A:
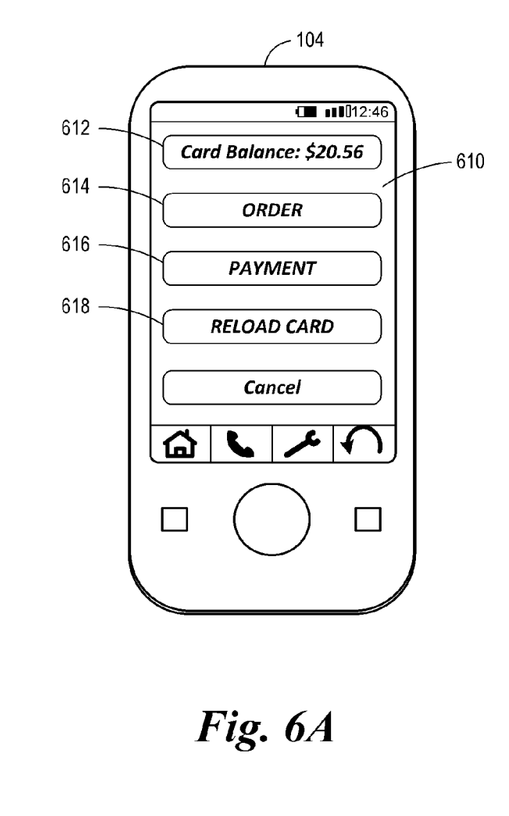
FIGS. 6A through 6C illustrate another embodiment of user interfaces of the network-based application implementing functionality of the network-based application.
Figure 6B:
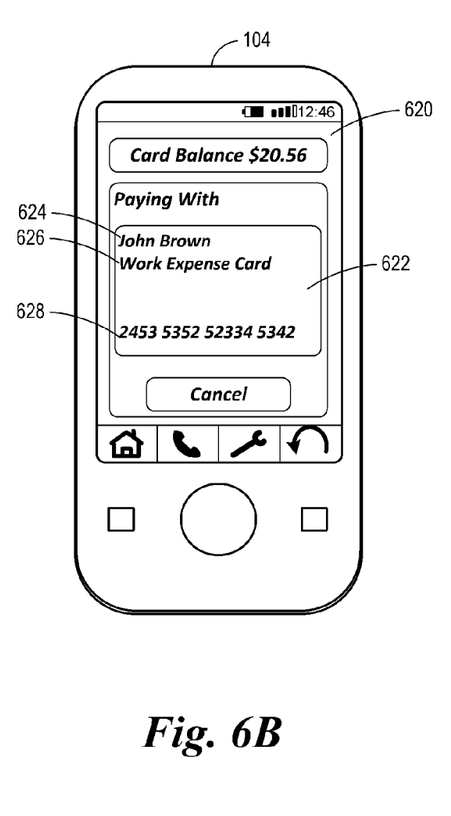
Figure 6C:
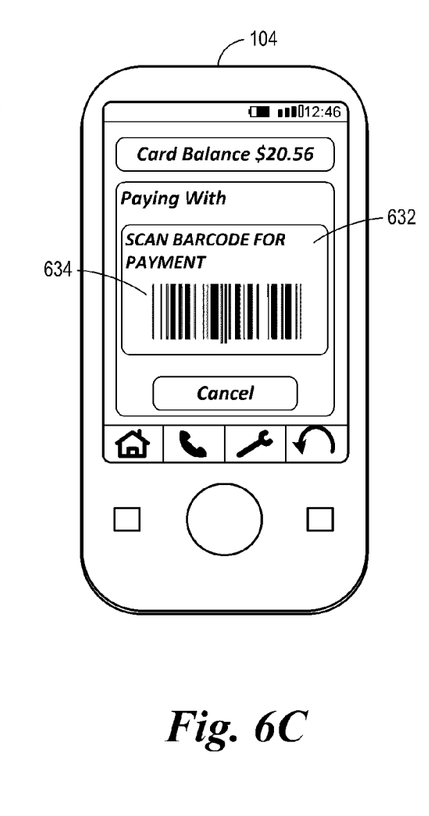

FIGS. 6A through 6C illustrate network-based application functionality that utilizes user information that is associated with a specific user account, whereas FIGS. 5A and 5B illustrate general functionality associated with application information. FIGS. 6A through 6C shows functionality associated with providing a virtual card, also referred to as an account card, for usage at an establishment associated with the virtual card. FIG. 6A illustrates a user interface 610 has various options including the card balance 612, order information 614; payment information 616 and a card reload function 618. The card balance 612 shows the balance of the card selected as the current method of payment. The card reload function 618 would not be available in the offline mode because it would require network connectivity in order to add funds to a card.

FIG. 6B illustrates a payment information user interface 620. In this embodiment the user interface 620 shows a virtual card 622. The virtual card 622 can include identification information such as user name associated with the card 624, a card nickname 626, and a card identifier or account number 628. The interface 620 can also continue to display the card balance 612 of the currently selected virtual card. In some embodiments where the user account has a plurality of virtual cards associated with the account, the network-based application may provide the user with an interface for selecting the virtual to use as the payment card. In such a case the card balance can be updated to show the balance of the card selected for payment.

FIG. 6C illustrates an embodiment of additional information associated with the virtual card selected for payment. In the illustrated embodiment, the backside 632 of the card is illustrated. In one embodiment the user could select the virtual card 622 to transition to the backside 632. In some embodiments, the user can use a touch based-control, such as tapping the card 622 in order to cause the card to flip over to reveal the backside 632 and show the computer readable code 634. The computer readable code 634 includes transaction information that a point-of-sale terminal can use approve or deny a transaction.

In some embodiments the computer readable code 634 can provide transaction information that the point-of-sale terminal can use to communicate with the interactive computing system in order to approve a transaction. For example, the computer readable code 634 can provide a card identifier, a user account identifier, an account balance, and/or other information. In some embodiments, the computer readable code 634 can provide information to the point-of-sale terminal that can be used by the point-of-sale terminal to approve the transaction, such as a card account number and an account balance. Based on this information the point of sale terminal could authorize the transaction. When the point of sale terminal authorizes the transaction, the network based application may not automatically update, but the point of sale terminal can transfer the information to the interactive computing system. The interactive computing system can use that information to update the user account information associated with the virtual card. When the network-based application goes back to online mode, the network-based application receives an update to the user account information based on that transaction with the point of sale terminal.

Figure 7:
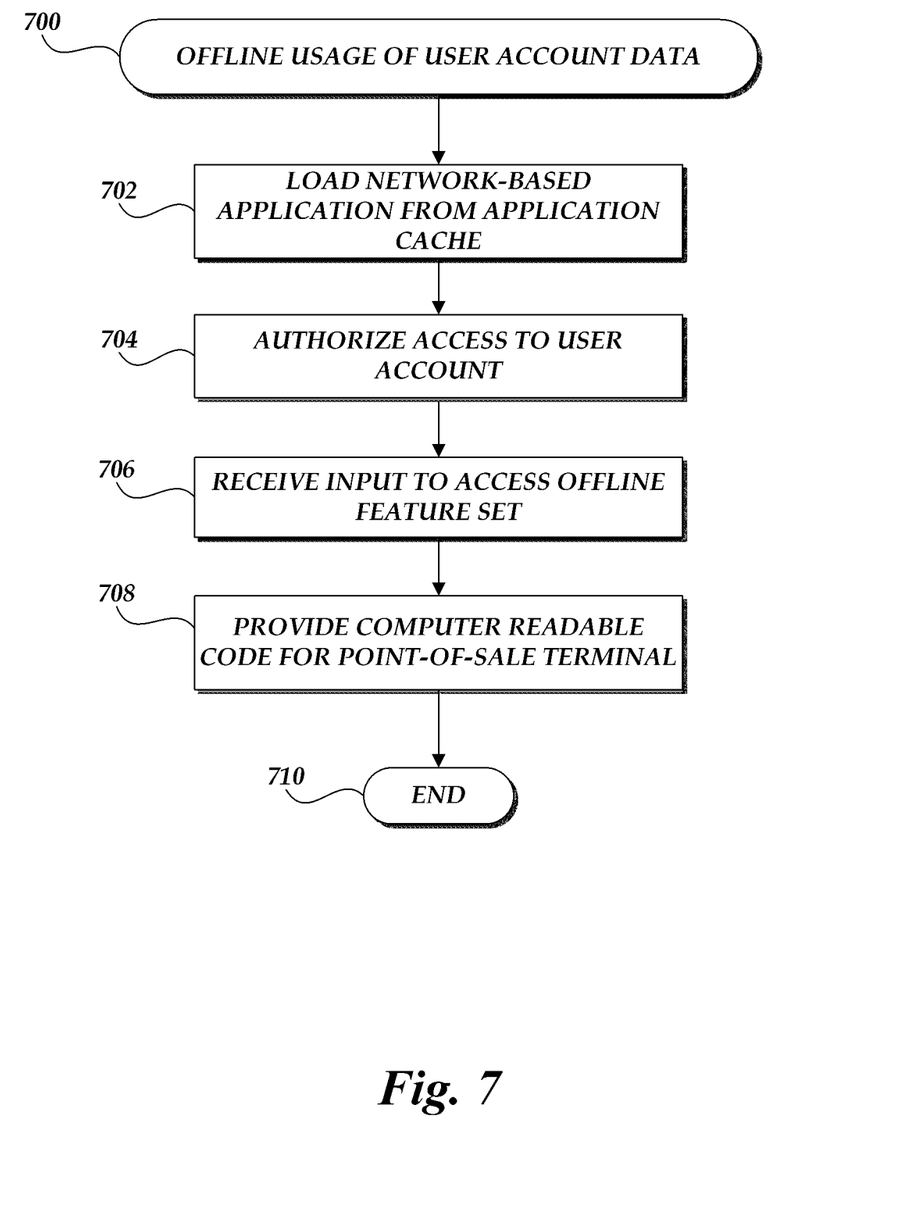
FIG. 7 is an embodiment of a flow diagram depicting an illustrative routine for implementing offline functionality in a network-based application.

FIG. 7 illustrates a flowchart of an embodiment of a routine 700 for offline usage of user account data. The routine 700 can be implemented by a browser 106 executing a network-based application. At block 702 a network-based application is loaded into a browser on a user device from an application cache of the browser. The network-based application is loaded based on information previously provided by an interactive computing system. The information stored in the application cached includes application information and user information.

At block 704 the network-based application authorizes access to a user account. Access to the user account can be granted based on authentication credentials provided by a user of the network-based application. In some embodiments, access to the user account can be granted based on a content object, such as a cookie, that can provide the appropriate authentication credentials to access the user account.

At block 706, the network-based application can receive input to access functions associated with an offline feature set. The network-based application can be configured to implement functions associated with application information and user information based on the input received from a user. The network-based application has access to the application information and user information stored in the application cache. The offline feature set can be a subset of the functions and content associated with the online feature set. The network-based application can access user information in order to perform functions that are associated with a specific user account. The user information stored in the application cache can provide the network-based application with sufficient information to implement specific functions related to the financial accounts associated with the user account.

At block 708, the network-based application can provide a computer readable code associated with the user account that is configured to interact with a point-of-sale terminal. In some embodiments, the network-based application is configured to generate the computer readable code based on the information stored in the application cache. In some embodiments, the computer readable code is generated by the interactive computing system and provided to the network-based application, which is stored in the application cache. The computer readable code can provide a point-of-sale terminal with sufficient information to approve or deny a transaction associated with the computer readable code. The point-of-sale terminal can communicate with the interactive computing system to approve or deny the transaction based on the information provided by the network-based application. At block 710 the process ends.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software or combinations of both. To clearly illustrate this interchangeability of hardware and software, various illustrative components, blocks, modules and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A network-based interactive computing system comprising:
   a data store configured to store user account information associated with a plurality of user accounts;
   an application module configured to provide network-based access for a user device to a network-based application,
   the network-based application configured to:
      receive and store a virtual card in an application cache of the user device in an online mode, the virtual card associated with a user account of the plurality of user accounts, wherein in the online mode the network application is in communication with the interactive computing system;
      subsequent to storage of the virtual card in the application cache and when the network application is in an offline mode,
         load the network-based application from an application cache;
         generate instructions to display a user interface including at least one user input control for accessing the virtual card;
         receive a request to access the virtual card, the request comprising user authentication credentials received by the at least one user input control;
         authorize access to the virtual card based, at least in part, on a comparison of the user authentication credentials to authentication information stored in the application cache; and
         generate instructions to display the virtual card within the user interface, the user interface comprising a card access user input control associated with the virtual card;
         in response to input received by the card access user input control, provide a computer readable code configured to communicate transaction information associated with the virtual card to a point-of-sale terminal in the offline mode, wherein the transaction information is based, at least in part, on the virtual card stored in the application cache, wherein in the offline mode the network application is not in communication with the interactive computing system;
   a user account module configured to:
      receive the transaction information from the point of sale terminal requesting authorization for a transaction;
      identify the user account associated with the virtual card based, at least in part, on the transaction information;
      determine whether to authorize payment for the transaction based, at least in part, on user account information associated with the user account identified by the transaction information; and
      provide a response to the point of sale terminal based on the determination.

2. The system of claim 1, wherein the transaction information comprises a card identifier associated with a financial account stored within the user account.

3. The system of claim 1, wherein the computer readable code is an optically readable code.

4. The system of claim 1, wherein the transaction is a purchase at a food service establishment.

5. A computer implemented method comprising:
   by a mobile computing device executing a browser application,
      receiving, by a network-based application executing within the browser application on the mobile computing device, application data and user account information from an interactive computing system over a network, the user account information comprising authentication information associated with a user account and the application data comprising content data and operational data associated with the operation of the network-based application;
      storing at least a portion of the application data and the user account information in an application cache of the browser;
      subsequent to storage of the application data and the user account information in the application cache and when the network-based application is not in communication with the interactive computing system,
         receiving, by the browser application, a request to access the network-based application;
         accessing the stored application data from the application cache;
         executing the network-based application based at least in part on the stored application data;
         receiving a request to access the user account information within the network-based application, the request comprising user authentication credentials;
         authorizing access to the user account information card based, at least in part, on a comparison of the user authentication credentials to the authentication information stored in the application cache;
         receiving, by the network-based application, user input requesting a computer readable code associated with the user account information; and
         outputting, by the network-based application, the computer readable code within the network-based application based at least in part on the stored application data and the stored user information, wherein the computer readable code comprises user information associated with the user account, wherein the computer readable code is configured for communication of the user information to a point-of-sale terminal, the point-of-sale terminal configured to communicate with the interactive computing system to authorize the transaction based, at least in part, on the user information.

6. The method of claim 5, wherein the computer readable code is an optically readable code.

7. The method of claim 5, wherein the computer readable code is a radio frequency code.

8. The method of claim 7 further comprising transmitting the computer readable code to the point-of-sale terminal.

9. The method of claim 5, wherein the user information comprises a card identifier.

10. The method of claim 5 further comprising receiving confirmation from the point-of-sale terminal that the transaction is successful and updating the user information within the network-based application.

11. The method of claim 5, wherein the transaction is a purchase at a food service establishment.

12. The method of claim 5, wherein the user information is associated with a virtual card having a monetary balance.

13. The method of claim 5, wherein the user information is associated with a virtual card having a non-monetary account balance.

14. The method of claim 5 further comprising generating the computer readable code based, at least in part, on the user information stored in the application cache.

15. The method of claim 5, wherein the point-of-sale terminal is configured to request authorization for the transaction from the interactive computing system.

16. A computer-readable, non-transitory storage medium storing computer executable instructions that, when executed by a browser operating on one or more computing devices, configure the browser to execute modules comprising:
 a network-based application module configured to operate in an online mode and an offline mode, wherein the network-based application module is configured to be in the online mode when the network-based application module is in communication with an interactive computing system over a network, and wherein the network-based application module is configured to be in the offline mode when the network-based application module is not in communication with the interactive computing system:
 in the online mode the network-based application module is configured to:
  receive user account information from the interactive computing system associated with a user account;
  store the user account information in an application cache of the browser;
 in the offline mode the network-based application is configured to:
  receive a request to access the user account information, the request comprising user authentication credentials;
  authorize access to the user account information card based, at least in part, on a comparison of the user authentication credentials to authentication information stored in the application cache;
  receive a request to provide a computer readable code based, at least in part, on the user account information; and
  provide the computer readable code configured to communicate transaction information to a point-of-sale terminal, wherein the transaction information comprises, at least a portion of, the user account information, wherein the point-of-sale terminal is configured to communicate with the interactive computing system to authorize the transaction based, at least in part, on the transaction information.

17. The storage medium of claim 16, wherein the computer readable code is an optically readable code.

18. The storage medium of claim 16, wherein the computer readable code is a radio frequency code.

19. The storage medium of claim 16, wherein the transaction information comprises a card identifier.

20. The storage medium of claim 16, wherein the network-based application module is further configured to receive confirmation from the point-of-sale terminal that the transaction is successful and update the user information within the network-based application.

21. The storage medium of claim 16, wherein the transaction is a purchase at a food service establishment.

22. The storage medium of claim 16, wherein the transaction information is associated with a virtual card having a monetary balance.

23. The storage medium of claim 16, wherein the transaction information is associated with a virtual card having a non-monetary balance.

* * * * *